United States Patent [19]

Loeffler et al.

[11] Patent Number: 4,774,324
[45] Date of Patent: Sep. 27, 1988

[54] ISOTHIAZOLYLAZO DYES

[75] Inventors: Hermann Loeffler, Speyer; Ernst Schefczik, Ludwigshafen, both of Fed. Rep. of Germany

[73] Assignee: BASF Aktiengesellschaft, Ludwigshafen, Fed. Rep. of Germany

[21] Appl. No.: 838,195

[22] Filed: Mar. 7, 1986

Related U.S. Application Data

[63] Continuation-in-part of Ser. No. 641,580, Aug. 17, 1984, abandoned.

[30] Foreign Application Priority Data

Aug. 20, 1983 [DE] Fed. Rep. of Germany ....... 3330155

[51] Int. Cl.⁴ ............................................. C09B 29/42
[52] U.S. Cl. ......................................... 534/766; 8/691
[58] Field of Search ......................................... 534/766

[56] References Cited

U.S. PATENT DOCUMENTS

| 29,640 | 5/1878 | Lamm et al. | |
|---|---|---|---|
| 3,950,321 | 4/1976 | Dehnert et al. | 534/766 X |
| 3,998,802 | 12/1976 | Dehnert et al. | |
| 4,016,152 | 4/1977 | Dehnert et al. | |
| 4,042,578 | 8/1977 | Dehnert et al. | |
| 4,066,637 | 1/1978 | Ramanathan | 534/766 X |
| 4,068,085 | 1/1978 | Ramanathan et al. | 260/156 |
| 4,146,535 | 3/1979 | Dehnert et al. | 260/156 |
| 4,208,324 | 6/1980 | Ramanathan | 534/766 |
| 4,325,870 | 4/1982 | Bahler et al. | 260/156 |
| 4,500,455 | 2/1985 | Niwa et al. | 534/766 X |

FOREIGN PATENT DOCUMENTS

| 0087677 | 2/1983 | European Pat. Off. | |
|---|---|---|---|
| 840545 | 6/1952 | Fed. Rep. of Germany | |
| 7303378 | 3/1973 | Netherlands | 564/766 |

Primary Examiner—Floyd D. Higel
Assistant Examiner—Carolyn S. Greason
Attorney, Agent, or Firm—Oblon, Fisher, Spivak, McClelland & Maier

[57] ABSTRACT

Compounds of the general formula I

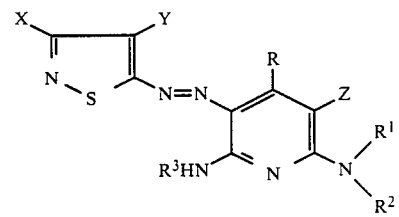

where X is unsubstituted or substituted alkyl, cycloalkyl, aralkyl or aryl, Y is chlorine, bromine, carbamyl or cyano, Z is hydrogen, carbamyl, cyano or acetyl, R is hydrogen or $C_1$–$C_3$-alkyl, $R^1$ and $R^3$ independently of one another are each hydrogen or unsubstituted or substituted alkyl, alkenyl, cycloalkyl, aralkyl or aryl, $R^2$ is hydrogen or unsubstituted or substituted alkyl and $R^1$ and $R^2$, together with the nitrogen atom, form a saturated 5-membered or 6-membered ring, are particularly useful for dyeing textile fibers.

2 Claims, No Drawings

ISOTHIAZOLYLAZO DYES

This is a continuation-in-part of application Ser. No. 641,580, filed Aug. 17, 1984, abandoned.

BACKGROUND OF THE INVENTION

1. Field of the Invention

The present invention relates to compounds of the general formula I

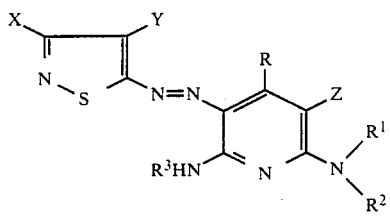

where X is unsubstituted or substituted alkyl, cycloalkyl, aralkyl or aryl, Y is chlorine, bromine, carbamyl or cyano, Z is hydrogen, carbamyl, cyano or acetyl, R is hydrogen or $C_1$-$C_3$-alkyl, $R^1$ and $R^3$ independently of one another are each hydrogen or unsubstituted or substituted alkyl, alkenyl, cycloalkyl, aralkyl or aryl, $R^2$ is hydrogen or unsubstituted or substituted alkyl and $R^1$ and $R^2$, together with the nitrogen atom, form a saturated 5-membered or 6-membered ring.

2. Description of the Preferred Embodiments

Examples of radicals X are $C_1$-$C_8$-alkyl which can be substituted by chlorine, bromine, cyano, hydroxyl, $C_1$-$C_4$-alkoxy, phenoxy, $C_1$-$C_8$-alkoxycarbonyl, unsubstituted or substituted phenyl, carbamyl or amino, and $C_5$-$C_7$-cycloalkyl, and phenyl which is unsubstituted or substituted by fluorine, chlorine, bromine, $C_1$-$C_4$-alkyl or $C_1$-$C_4$-alkoxy.

Specific examples of radicals X are:

$CH_3$, $C_2H_5$, $C_3H_7$, $(CH_3)_2CH$, $C_4H_9$, $(CH_3)_2CHCH_2$, $C_5H_{11}$, $C_6H_{12}$, $C_7H_{15}$, $C_4H_9CH(C_2H_5)CH_2$, $CNCH_2$, $CNC_2H_4$, $ClC_2H_4$, $BrC_2H_4$, $HOC_2H_4$, $CH_3OC_2H_4$, $C_2H_5OC_2H_4$, $C_3H_7OC_2H_4$, $C_4H_9OC_2H_4$, $C_4H_9OC_2H_4OC_2H_4$, $C_6H_{13}OC_2H_4$, $C_6H_5OC_2H_4$, $(CH_3)_2NC_2H_4$, $CH_3OOCCH_2$, $C_2H_5OOCCH_2$, $(CH_3)_2NCOCH_2$, $(C_2H_5)_2NCOCH_2$, 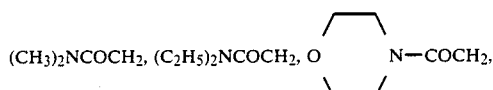

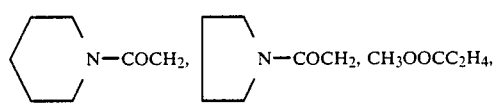 $CH_3OOCC_2H_4$, $C_2H_5OOCC_2H_4$, 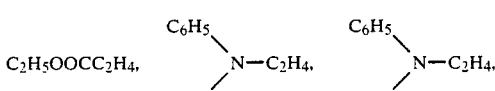

$C_6H_5SO_2CH_2$, $C_6H_5CH_2$, $C_6H_5C_2H_4$, 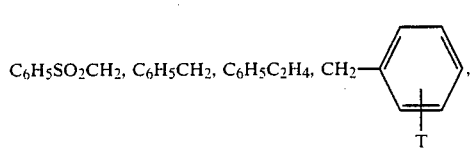

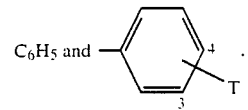

where T is F, Cl, Br, $CH_3$, $OCH_3$ or $OC_2H_5$.

Examples of radicals $R^1$ and $R^3$ are:

1. Unsubstituted or substituted alkyl, such as $CH_3$, $C_2H_5$, n-$C_3H_7$, $CH(CH_3)_2$, n-$C_4H_9$, $CH_2$-$CH(CH_3)_2$, $CH(CH_3)$-$C_2H_5$, n-$C_5H_{11}$, $CH$-$CH(CH_3)_2$ (with $CH_3$), $CH(C_2H_5)_2$, $CH(CH_3)$-$C_3H_7$.

$CH(CH_3)$-$CH(CH_3)$-$CH_3$ (with $CH_3$, $CH_3$), $C_2H_4$-$CH(CH_3)_2$, $CH_2$-$C(CH_3)_3$, $C_6H_{13}$, $C_7H_{15}$, $CH(C_2H_5)$-$C_4H_9$, $CH(C_3H_7)_2$, $CH[CH(CH_3)_2]_2$, $CH(CH_3)$-$C_2H_4$-$CH(CH_3)_2$, $C_8H_{17}$, $CH(C_2H_5)$-$C_4H_9$, $CH(CH_3)$-$C_3H_6$-$CH(CH_3)_2$, $C_9H_{18}$, $C_{10}H_{21}$, $C_{12}H_{25}$, $C_{13}H_{27}$;

$C_2H_4OH$, $C_3H_6OH$, $CH_2$-$CH(CH_3)$-$OH$, $CH(CH_3)$-$CH_2$-$OH$, $C_4H_8OH$, $CH(CH_3)$-$C_2H_4$-$OH$, $CH(C_2H_5)$-$CH_2$-$OH$, $C_6H_{12}OH$, $CH(CH_3)$-$C_3H_6C(CH_3)_2OH$;

$C_2H_4OCH_3$, $C_2H_4OC_2H_5$, $C_2H_4OC_3H_7$, $C_2H_4OC_4H_9$, $C_2H_4OC_6H_5$, $C_2H_4OC_6H_{11}$, $C_2H_4CN$, $C_5H_{10}CN$, $C_6H_{12}CN$, $C_2H_4OC_2H_4CN$, $C_3H_6OC_2H_4CN$, $C_3H_6OCH_3$, $C_3H_6OC_2H_5$, $C_3H_6OC_3H_7$, $C_3H_6OC_4H_9$, $C_3H_6OCH_2$-$CH(C_2H_5)$-$C_4H_9$, $C_3H_6OC_6H_{13}$, $C_3H_6OC_8H_{17}$, $C_3H_6OCH_2C_6H_5$, $C_3H_6OC_2H_4C_6H_5$, $C_3H_6OC_2H_4OC_6H_5$, $C_3H_6OC_6H_5$, $C_3H_6OC_2H_4OH$, $C_3H_6OC_4H_8OH$, $C_3H_6OC_2H_4OCH_3$, $C_3H_6OC_2H_4OC_2H_5$, $C_3H_6OC_2H_4OCH(CH_3)_2$, $C_3H_6OC_2H_4OC_4H_9$, $C_3H_6OC_2H_4OCH_2C_6H_5$, $C_3H_6OC_2H_4OC_6H_5$, $C_3H_6OC_2H_4OC_6H_{11}$, $CH(CH_3)$-$CH_2OCH_3$, $CH(CH_3)CH_2OC_4H_9$, $CH(CH_3)$-$CH_2OC_6H_5$, $CH(CH_3)CH_2OCH_2C_6H_5$, $CH(CH_3)$-$C_2H_4OCH_3$, $CH(C_2H_5)$-$CH_2$-$OCH_3$,

-continued

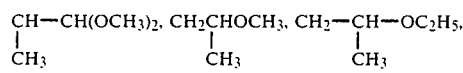

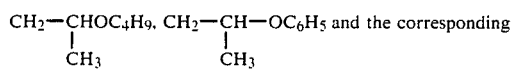

radicals which contain two $C_2H_4O$, $C_3H_6O$, $\underset{CH_3}{CH-CH_2O}$ or $\underset{CH_3}{CH_2-CHO}$ groups;

and

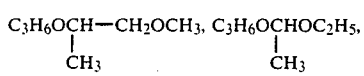

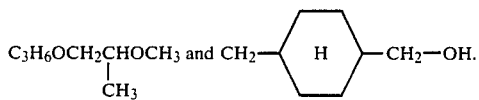

2. Unsubstituted or substituted cycloalkyl radicals:

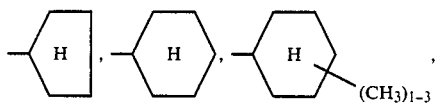

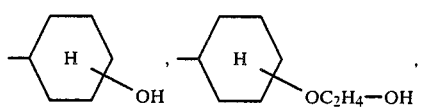

3. Unsubstituted or substituted aralkyl radicals:

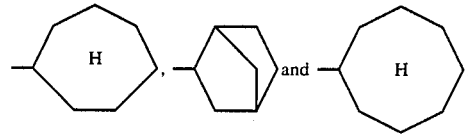

$\underset{CH-C_6H_5}{C_3H_7}$ and the corresponding radicals containing $C_6H_4CH_3$ and $C_6H_4OCH_3$ instead of $C_6H_5$;

4. Unsubstituted or substituted phenyl radicals: $C_6H_5$, $C_6H_4CH_3$, $C_6H_3(CH_3)_2$, $C_6H_4OCH_3$, $C_6H_3(OCH_3)_2$, $C_6H_4Cl$ and $C_6H_2(OCH_3)_2Cl$;

5. The radicals $CH_2CH=CH_2$, $CH_2COOCH_3$, $(CH_2)_5COOCH_3$, $(CH_2)_5COOC_2H_5$, $(CH_2)_5COOC_4H_9$,

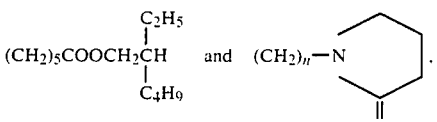

where n is 2, 3, 4 or 6.

6. Acyloxyradicals: $(CH_2)_2OCHO$, $(CH_2)_2OCOCH_3$, $(C_2H_4O)_2CHO$ $(C_2H_4O)_2COCH_3$, $(CH_2)_2OCOC_3H_7$,

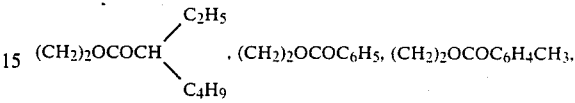

$(CH_2)_2OCOC_6H_4Cl$, $(CH_2)_2OCOC_{10}H_7$, $(CH_2)_2OCONHCH_3$,

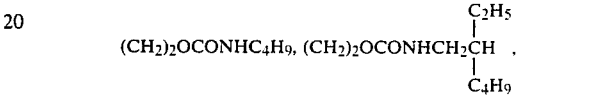

$(CH_2)_2OCONHC_6H_5$, $(CH_2)_2OCONHC_6H_4Cl$ and $(CH_2)_2OCONHC_6H_3Cl_2$ and the corresponding radicals containing $(CH_2)_3$, $(CH_2)_4$ or $(CH_2)_6$ instead of $(CH_2)_2$.

7. Acyl radicals: CHO, $CH_3CO$, $C_2H_5CO$, $C_3H_7CO$,

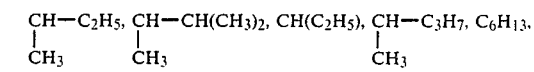

$C_2H_5CO$, $CH_3C_6H_4CO$, $C_6H_5CH_2CO$, $C_6H_5OCH_2CO$, $CH_3SO_2$, $C_2H_5SO_2$, $C_6H_5SO_2$ and $CH_3C_6H_4SO_2$.

Examples of preferred substituents are hydrogen, $C_2H_5$, $CH(CH_3)_2$, n-$C_4H_9$, $CH_2-CH(CH_3)_2$,

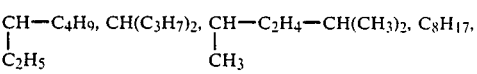

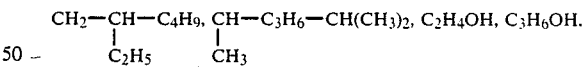

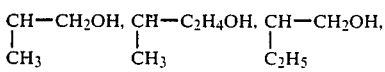

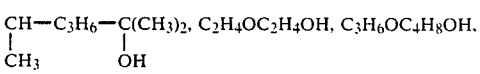

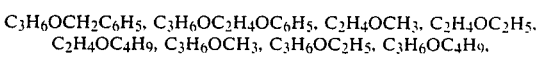

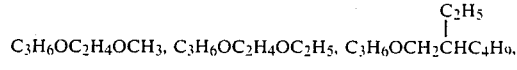

-continued

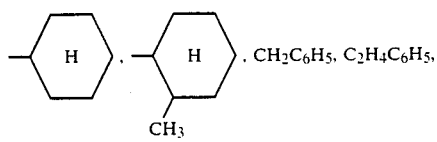

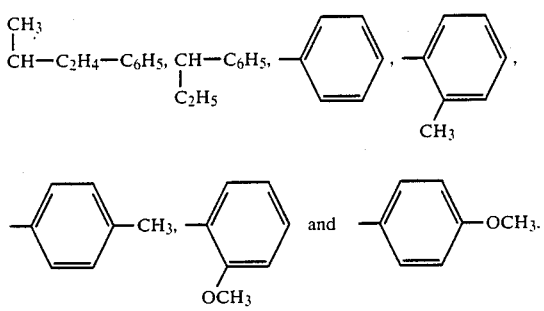

Examples of radicals R², in addition to hydrogen, are

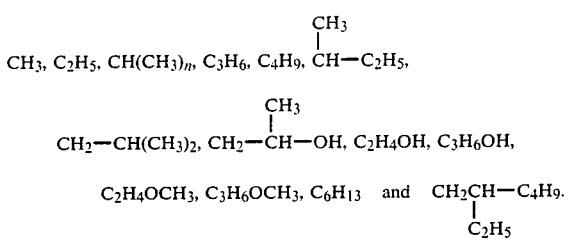

Examples of radicals formed by R¹ and R² together with the nitrogen atom are:

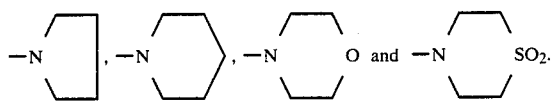

Depending on their structure, the compounds of the formula I are suitable, for example, as disperse dyes for synthetic polyesters, as transfer dyes for dyeing thermoplastic materials consisting of, for example, polystyrene, polyethylene, polypropylene, nylon or their block polymers, and for dyeing cotton and union fabrics of cotton and polyesters, for example by the method described in German Patent No. 1,811,796.

As a rule, very fast dyeings and prints are obtained.

The dyes are as a rule further distinguished by good color build-up substantially independent of the pH-value of the dyeing bath.

Particularly important compounds are those of the formula Ia

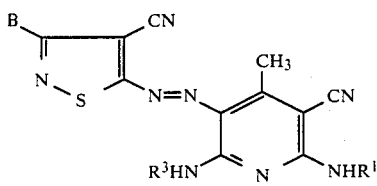

where B is methyl or isopropyl, or is phenyl or benzyl which is unsubstituted or substituted by methyl, methoxy, chlorine or bromine, and R¹ and R³ have the above meanings. R¹ is preferably phenyl which is unsubstituted or substituted by methyl, methoxy, chlorine or bromine. Particularly preferred dyes of the formula Ia are those in which B and R¹ are each phenyl which is unsubstituted or substituted by methyl, methoxy, chlorine or bromine, and R³ is one of the abovementioned radicals which is bonded to the amino group via a secondary carbon atom.

The compounds of the formula I can be prepared by reacting a diazonium compound of an amine of the formula

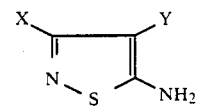

with a coupling component of the formula

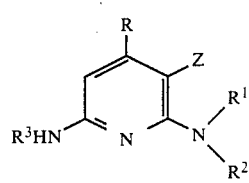

by a conventional method.

The Examples which follow illustrate the reactions. Parts and percentages are by weight, unless stated otherwise.

EXAMPLE 1

20.1 parts of 5-amino-4-cyano-3-phenylisothiazole in a mixture of 150 parts by volume of a 17:3 glacial acetic acid/propionic acid mixture and 70 parts of 80% strength sulfuric acid are stirred, and 32 parts of nitrosylsulfuric acid (11.5% of $N_2O_3$) are added slowly at 15°–20° C. The mixture is stirred for 3 hours at this temperature and in the presence of an excess of nitrous acid, and stirring is then continued for a further 15 minutes in the presence of 5 parts of urea. The resulting diazo solution is then run into a solution of 34 parts of 2-(2-methoxyphenylamino)-3-cyano-4-methyl-6-cyclohexylaminopyridine in 300 parts by volume of glacial acetic acid and 150 parts by volume of dimethylformamide, and stirring is continued at 15° C. until coupling is complete, which takes about 30 minutes. Filtration under suction and washing with 300 parts by volume of glacial acetic acid and with hot water give the dye of the formula:

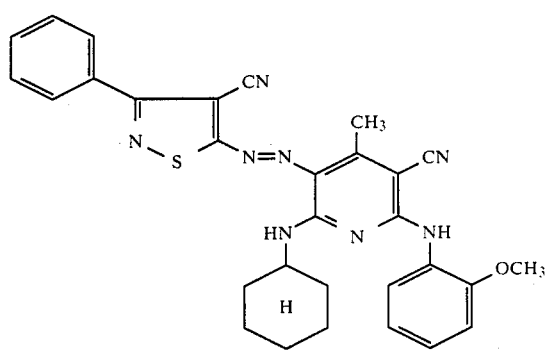

as an aqueous paste (λmax.=533 nm). A union fabric consisting of 63 parts of polyester and 37 parts of cotton is impregnated, at pH 6, with a formulation consisting of 6 parts (based on dry substance) of this dye, 80 parts of polyethylene glycol having a molecular weight of 1,500, 20 parts of a reaction product obtained from 1 mole of hexamethylenediamine and 15 moles of ethylene oxide and 894 parts of water. The impregnated fabric is dried at 110° C. and then treated with hot air at 215° C. for 5 minutes. It is washed with cold water, and the dyeing is treated with a commercial detergent at 100° C. A very lightfast, washfast, brilliant bluish red dyeing which is fast to solvents and to crocking is obtained in this manner.

EXAMPLE 2

If, using the preparation conditions described in Example 1, 20.1 parts of 5-amino-4-cyano-3-phenylisothiazole are diazotized and the product is coupled to 32 parts of 2-(2-ethylhexyloxyprop-3′-ylamino)-3-cyano-4-methyl-6-aminopyridine, a dye of the formula is obtained (λmax=511 nm).

A polyester/cotton union fabric is printed with a formulation consisting of 10 parts of the dye from Example 2, 100 parts of a reaction product obtained from polyethylene oxide having a molecular weight of 300 with boric acid in a molar ratio of 3:1, 30 parts of oleic acid diethanolamide and 860 parts of a 3% strength alginate thickener, and the print is dried at 110° C., treated with superheated steam at 185° C. for 5 minutes, washed with cold water and then washed with a commercial detergent at 100° C. A lightfast, washfast, reddish orange print on a white ground is obtained, the print being fast to solvents.

On a pure cotton fabric, the same procedure gives a print which is of the same color and has equally good fastness properties.

The dyes in the Table below are obtained by similar procedure. They are preferably used by the stated procedure, and give very fast dyeings and prints on polyesters and polyester/cotton blends, and in some cases also on pure cotton.

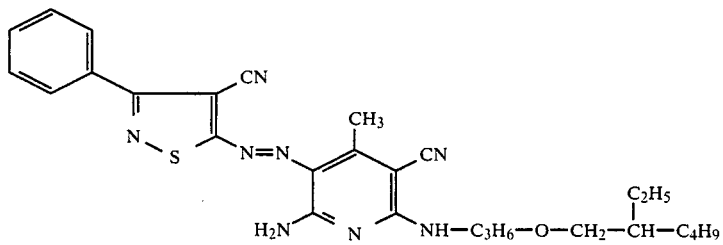

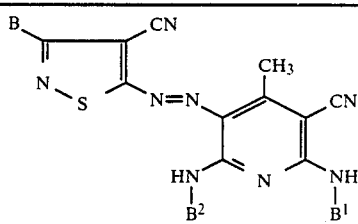

| Ex. No. | B | B¹ | B² | λ$_{max.}$ |
|---|---|---|---|---|
| 3 | phenyl | 2-methoxyphenyl | 4-methylcyclohexyl (H) | 532.5 |
| 4 | " | " | 4-methylcyclohexyl (H, CH₃) | 533 |
| 5 | " | phenyl | cyclohexyl (H) | 536 |
| 6 | " | " | 3-methylcyclohexyl (H, CH₃) | 535 |

-continued
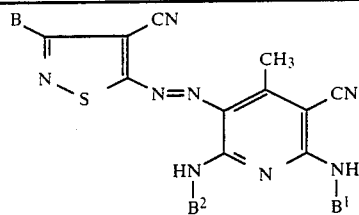
| Ex. No. | B | B¹ | B² | $\lambda_{max}$ |
|---|---|---|---|---|
| 7 | " | ⌬—OCH₃ (para) | ⌬ H (cyclohexyl) | 538.5 |
| 8 | " | " | ⌬ H, CH₃ (methylcyclohexyl) | 538 |
| 9 | ⌬—CH₃ (para-tolyl) | ⌬—OCH₃ (ortho) | H | 532.5 |
| 10 | ⌬—OCH₃ (para) | " | " | 532.5 |
| 11 | " | " | ⌬—OCH₃ (ortho) | 538.5 |
| 12 | ⌬ (phenyl) | ⌬ (phenyl) | CH—CH₂—OCH₃<br>\|<br>C₂H₅ | 534 |
| 13 | " | ⌬—OCH₃ (ortho) | " | 532.5 |
| 14 | " | " | CH(CH₃)₂ | 533 |
| 15 | " | " | CH—C₃H₆CH(CH₃)₂<br>\|<br>CH₃ | 533 |
| 16 | " | " | C₂H₄OCH₃ | 534 |
| | | ⌬ (phenyl) | | |
| 17 | " | ⌬—OCH₃ (ortho) | " | 530.5 |

-continued
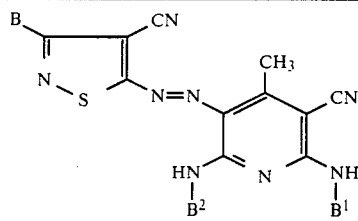
| Ex. No. | B | B¹ | B² | $\lambda_{max.}$ |
|---|---|---|---|---|
| 18 | " | phenyl | $C_3H_6OCH_3$ | 535.5 |
| 19 | " | 2-methoxyphenyl | " | 531.5 |
| 20 | " | phenyl | $C_3H_6OC_2H_4OC_6H_5$ | 535 |
| 21 | " | 2-methoxyphenyl | " | 531 |
| 22 | " | phenyl | $C_3H_6OCH_2CH(C_2H_5)C_4H_9$ | 534.5 |
| 23 | " | 2-methoxyphenyl | " | 530.5 |
| 24 | " | " | H | 526.5 |
| 25 | " | cyclohexyl (H) | phenyl | 535 |
| 26 | " | " | 2-methoxyphenyl | 533 |
| 27 | " | 2-methylcyclohexyl | " | 532 |

-continued
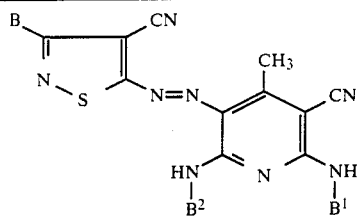
| Ex. No. | B | B¹ | B² | $\lambda_{max.}$ |
|---|---|---|---|---|
| 28 | 4-CH₃-C₆H₄- | H | C₆H₅- | 535.5 |
| 29 | 4-CH₃O-C₆H₄- | " | " | 535.5 |
| 30 | " | " | 2-CH₃O-C₆H₄- | 532.5 |
| 31 | 4-CH₃-C₆H₄- | 2-CH₃-C₆H₄- | 2-CH₃-C₆H₄- | 527.5 |
| 32 | 4-CH₃O-C₆H₄- | " | " | 527 |
| 33 | 4-CH₃-C₆H₄- | H | " | 528 |
| 34 | 4-CH₃O-C₆H₄- | " | " | 528 |
| 35 | 4-CH₃-C₆H₄- | 2-CH₃-C₆H₄- | 2-CH₃O-C₆H₄- | 531.5 |
| 36 | 4-CH₃O-C₆H₄- | " | " | 532 |
| 37 | 4-CH₃-C₆H₄- | C₆H₅- | " | 532.5 |

-continued
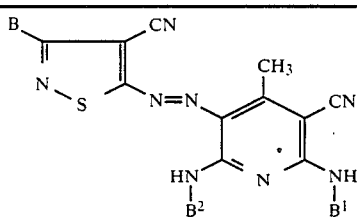
| Ex. No. | B | B¹ | B² | $\lambda_{max}$ |
|---|---|---|---|---|
| 38 | phenyl | $C_2H_4OCH_3$ | phenyl | 533 |
| 39 | " | $C_3H_6OCH_3$ | " | 534 |
| 40 | 4-CH₃-phenyl | $CH(C_2H_5)-CH_2-OCH_3$ | 2-CH₃-phenyl | 526.5 |
| 41 | 4-OCH₃-phenyl | $CH(C_2H_5)-CH_2OCH_3$ | " | 527 |
| 42 | 4-CH₃-phenyl | " | 2-OCH₃-phenyl | 531 |
| 43 | phenyl | $CH(CH_3)-C_3H_6CH(CH_3)_2$ | phenyl | 532 |
| 44 | 4-OCH₃-phenyl | " | " | 532 |
| 45 | 4-CH₃-phenyl | " | 2-OCH₃-phenyl | 531.5 |
| 46 | " | 2-CH₃-cyclohexyl | 2-CH₃-cyclohexyl | 521.5 |
| 47 | 4-OCH₃-phenyl | " | " | 522 |
| 48 | phenyl | cyclohexyl | $CH(CH_3)-CH_2-OCH_3$ | 522 |

-continued

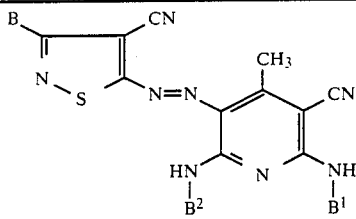

| Ex. No. | B | B¹ | B² | $\lambda_{max.}$ |
|---|---|---|---|---|
| 49 | " | " | CH(CH₃)₂ | 522.5 |
| 50 | " | " | CH—CH₂—OCH₃<br>\|<br>C₂H₅ | 521.5 |
| 51 | —⟨C₆H₄⟩—CH₃ | —⟨C₆H₁₀⟩ (2-CH₃) | CH₃<br>\|<br>CH—C₃H₆CH(CH₃)₂ | 522.5 |
| 52 | " | CH₃<br>\|<br>CH—C₃H₆CH(CH₃)₂ | CH(CH₃)₂ | 522 |
| 53 | " | C₂H₅<br>\|<br>C₃H₆OCH₂CHC₄H₉ | H | 510 |
| 54 | —⟨C₆H₄⟩—OCH₃ | " | H | 510 |
| 55 | CH₂—⟨C₆H₅⟩ | " | H | 508 |
| 56 | —⟨C₆H₅⟩ | —⟨C₆H₄⟩—OCH₃ (2-OCH₃) | —⟨C₆H₄⟩—OCH₃ | 540.5 |

EXAMPLE 57

27 parts of the coupling product obtained from 5-amino-4-cyano-3-phenylisothiazole and 2-(2-methoxyphenylamino)-3-cyano-4-methyl-6-(β-hydroxyethylamino)-pyridine are stirred in a mixture of 500 parts by volume of monochlorobenzene, 12 parts of phenoxyacetic acid and 2.5 parts of p-toluenesulfonic acid for 3 hours at 100° C. until thinlayer chromatography shows that the reaction is complete. The reaction mixture is cooled, and the product of the formula

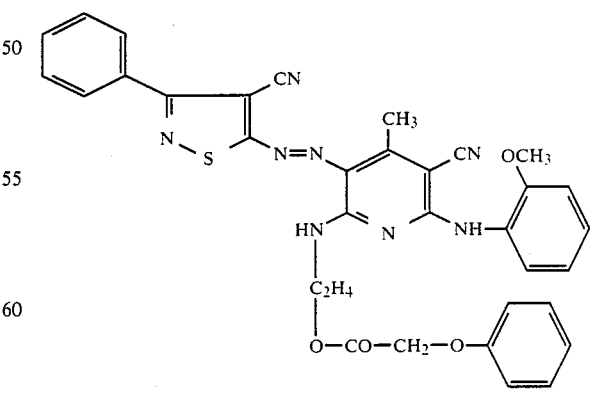

($\lambda$max. = 530 nm)

is then filtered off under suction and washed with methanol and with water. Using the dyeing conditions of Example 1, this product gives a brilliant bluish red dyeing with similar fastness properties.

EXAMPLE 58

16.2 parts of 2-(2-methoxyphenylamino)-3-cyano-4-methyl-5-(3-phenyo-4-cyanoisobenzothiazol-5'-ylazo)-6-[(2-hydroxy-1-ethyl)-ethylamino]-pyridine in 150 parts by volume of pyridine are stirred at 50° C., and 13 parts of benzoyl chloride are added dropwise. Stirring is continued at 50° C. until esterification is complete. The mixture is filtered under suction at room temperature, and the product is washed with ethanol and with water to give the dye of the formula phenylamino)-3-cyano-4-methyl-6-[(2-hydroxy-1-ethyl)-ethylamino]pyridine are stirred in 300 parts by volume of monochlorobenzene at 100° C. The reaction is completed by the dropwise addition of 12 parts of phenyl isocyanate and stirring for 5 hours at 100° C. The product is then filtered off under suction while hot and washed with ethanol to give the dye of the formula

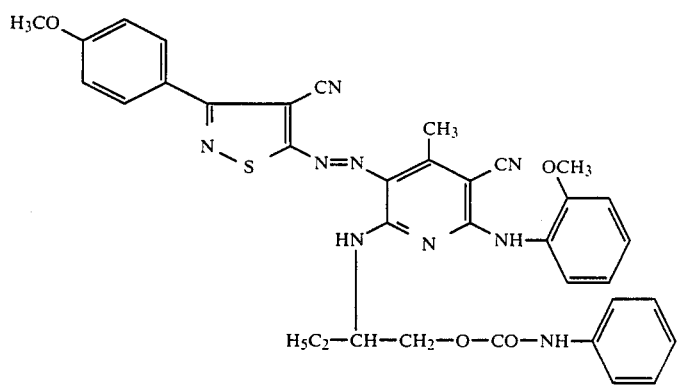

This dye dyes polyester/cotton blends in brilliant bluish red hues.

EXAMPLE 60

7 parts of 3-methyl-4-cyano-5-aminoisothiazole are introduced into a mixture of 40 parts by volume of glacial acetic acid, 20 parts of 85% strength sulfuric acid and 16 parts of nitrosylsulfuric acid (11.5% of $N_2O_3$) at from 0° to +5° C. The mixture is stirred for 3 hours at from 0° to 5° C., after which excess nitrous acid is destroyed with 3 parts of urea. The resulting diazo solution is then run into a solution of 16.5 parts of 2-[(2-phenoxy-3-ethoxy)propylamino]-3-cyano-4-methyl-6-aminopyridine in 200 parts by volume of acetic acid and 60 parts by volume of water at from 0° to 5° C. Coupling is complete after 2 hours. The product is filtered off under suction, washed with 70% strength acetic acid and dried at 80° C. to give the dye of the formula

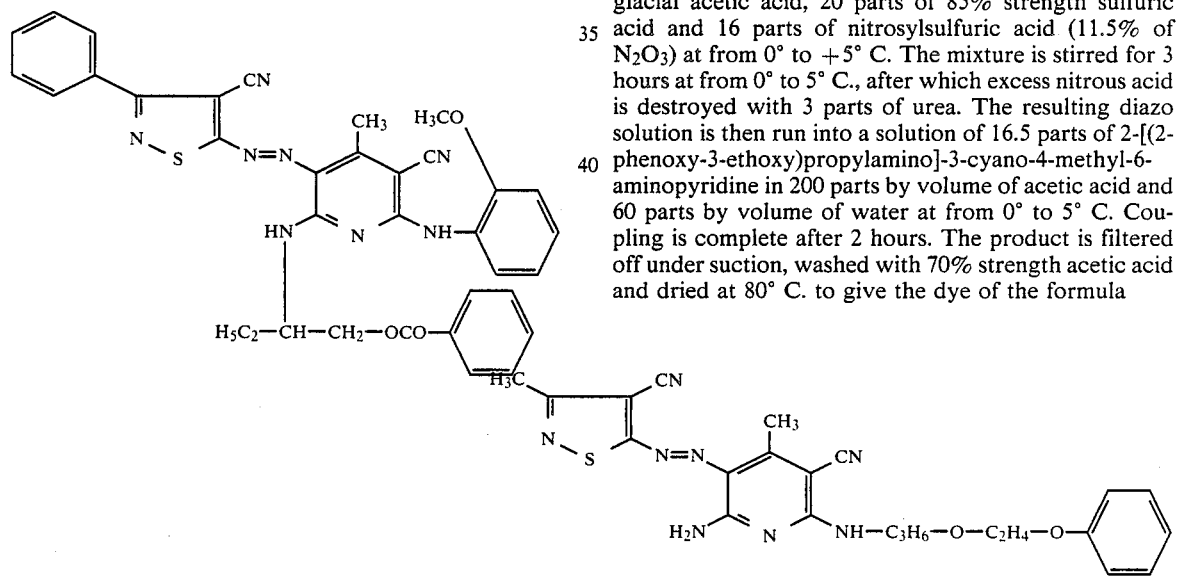

$\lambda$max. = 506 nm

When it is used for dyeing polyester/cotton blends, this dye gives results similar to those of Example 1.

EXAMPLE 59

16.5 parts of the dye obtained from 3-(4-methoxyphenyl)-4-cyano-5-aminoisothiazole and 2-(2-methoxyas a dark red powder, which dyes polyester material in orange hues with very good allround fastness.

The disperse dyes below are obtained using preparation conditions similar to those of Example 1, 2 or 60. Among these dyes, those products which are free of aromatic or strongly polar substituents are preferably used as transfer dyes.

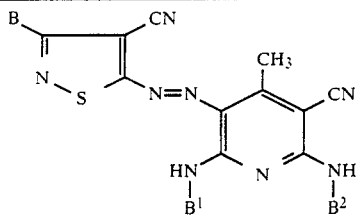
| Ex. No. | B | B¹ | B² | $\lambda_{max.}$ |
|---|---|---|---|---|
| 61 | $CH_3$ | $C_2H_4OCH_3$ | $C_2H_4OCH_3$ | 514 |
| 62 | $CH_3$ | $C_3H_6OCH_3$ | $C_3H_6OCH_3$ | 516.5 |
| 63 | $CH_3$ | $CH(C_2H_5)-CH_2OCH_3$ | $CH(C_2H_5)-CH_2OCH_3$ | 516.5 |
| 64 | $CH_3$ | $C_2H_5$ | $C_2H_5$ | 516 |
| 65 | $CH_3$ | $C_2H_5$ | $C_2H_4OCH_3$ | 515 |
| 66 | $CH_3$ | $C_2H_5$ | $C_3H_6OCH_3$ | 515 |
| 67 | $CH_2C_6H_5$ | $C_3H_6OCH_2CH(C_2H_5)-C_4H_9$ | H | 509 |
| 68 | $CH_2C_6H_5$ | $C_2H_4OC_4H_9$ | H | 508.5 |
| 69 | $C_6H_4OCH_3$ (p) | $C_2H_4OC_4H_9$ | H | 510.5 |
| 70 | $CH_2C_6H_4OCH_3$ (p) | $C_2H_4OCH_3$ | H | 509 |
| 71 | $CH_2C_6H_5$ | $C_2H_4OCH_3$ | $C_2H_4OCH_3$ | 517 |
| 72 | $C_6H_5$ | $C_2H_4OCH_3$ | $C_2H_4OCH_3$ | 519 |
| 73 | $CH_2C_6H_5$ | $C_3H_6OCH_3$ | $C_3H_6OCH_3$ | 519 |
| 74 | $CH_2C_6H_4OCH_3$ (p) | $C_4H_9$ | H | 509 |
| 75 | $CH_2C_6H_5$ | $C_6H_5$ | $C_3H_6OCH_3$ | 530 |

-continued
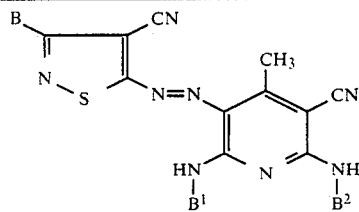
| Ex. No. | B | B¹ | B² | $\lambda_{max}$ |
|---|---|---|---|---|
| 76 | CH(CH₃)₂ | phenyl | C₃H₆OCH₃ | 528 |
| 77 | phenyl | phenyl | C₃H₆OCH₃ | 532 |
| 78 | CH₃ | phenyl | C₃H₆OCH₃ | 528 |
| 79 | CH₃ | 2-OCH₃-phenyl | C₃H₆OCH₃ | 531 |
| 80 | CH₂-phenyl | 2-OCH₃-phenyl | C₂H₄OCH₃ | 529.5 |
| 81 | CH₂-phenyl | 2-OCH₃-phenyl | CH(C₂H₅)—CH₂—OCH₃ | 529 |
| 82 | CH₃ | C₃H₆OCH₃ | C₂H₄OH | 516 |
| 83 | CH₂-phenyl | C₃H₆OCH₃ | C₂H₄OH | 518 |
| 84 | phenyl | C₃H₆OCH₃ | C₂H₄OH | 520 |
| 85 | CH₃ | phenyl | C₂H₄OH | 526 |
| 86 | CH₃ | phenyl | C₃H₆OH | 528 |

-continued
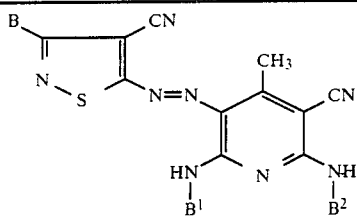
| Ex. No. | B | B¹ | B² | $\lambda_{max.}$ |
|---|---|---|---|---|
| 87 | CH₃ | 2-OCH₃-C₆H₄ | C₃H₆OH | 531 |
| 88 | CH₃ | 4-OCH₃-C₆H₄ | C₃H₆OH | 535 |
| 89 | CH₃ | 4-OCH₃-C₆H₄ | CH(CH₃)₂ | 535.5 |
| 90 | CH₃ | 2-OCH₃-C₆H₄ | C₂H₄OH | 528.5 |
| 91 | CH₃ | 2-OCH₃-C₆H₄ | CH(CH₃)₂ | 531 |
| 92 | C₆H₅ | 2-OCH₃-C₆H₄ | H | 525 |
| 93 | CH₃ | 2-OCH₃-C₆H₄ | H | 521 |
| 94 | CH₂C₆H₅ | C₆H₅ | H | 527 |
| 95 | CH(CH₃)₂ | 2-OCH₃-C₆H₄ | H | 521.5 |
| 96 | CH₃ | 4-OCH₃-C₆H₄ | H | 529 |

-continued
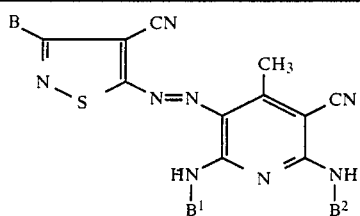
| Ex. No. | B | B¹ | B² | $\lambda_{max.}$ |
|---|---|---|---|---|
| 97 | $CH_3$ | –C₆H₅ | $C_3H_6OC_4H_8OH$ | 527 |
| 98 | $CH_3$ | –C₆H₄-o-OCH₃ | $C_3H_6OC_4H_8OH$ | 528 |
| 99 | $CH_3$ | –C₆H₄-p-OCH₃ | $C_3H_6OC_4H_8OH$ | 532 |
| 100 | $CH_3$ | –C₆H₅ | $C_3H_6OC_2H_4OC_6H_5$ | 528 |
| 101 | $CH_3$ | –C₆H₄-o-OCH₃ | $C_3H_6OC_2H_4OC_6H_5$ | 531 |
| 102 | $CH_3$ | –C₆H₄-p-OCH₃ | $C_3H_6OC_2H_4OC_6H_5$ | 532 |
| 103 | $CH_3$ | –C₆H₄-o-OCH₃ | $C_3H_6OCH_2CH(C_2H_5)C_4H_9$ | 531 |
The dyes below were also prepared by methods similar to those described above:

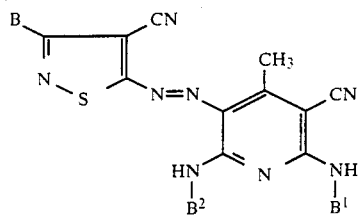
| Ex. No. | B | B¹ | B² | $\lambda_{max.}$ |
|---|---|---|---|---|
| 104 | 4-Cl-C₆H₄– | 2-OCH₃-C₆H₄– | cyclohexyl-2-CH₃ | 530.5 |
| 105 | C₆H₅– | 2-OCH₃-C₆H₄– | cyclohexyl-2,6-(CH₃)₂ | 532.5 |
| 106 | C₆H₅– | 2-OCH₃-C₆H₄– | cyclooctyl | 532 |
| 107 | C₆H₅– | C₆H₅– | cyclooctyl | 536 |
| 108 | C₆H₅– | C₆H₅– | cyclohexyl-2,6-(CH₃)₂ | 535.5 |
| 109 | 4-COOC₂H₅-C₆H₄– | 2-OCH₃-C₆H₄– | cyclohexyl | 533 |
| 110 | 4-COOC₂H₅-C₆H₄– | 2-OCH₃-C₆H₄– | cyclohexyl-2,6-(CH₃)₂ | 532.5 |
| 111 | 2,4-Cl₂-C₆H₃-CH₂– | 2-OCH₃-C₆H₄– | cyclohexyl-2-CH₃ | 530 |

-continued

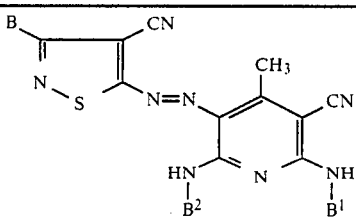

| Ex. No. | B | B¹ | B² | $\lambda_{max.}$ |
|---|---|---|---|---|
| 112 | 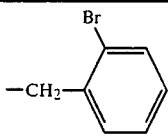 | 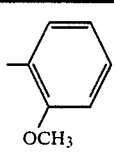 | 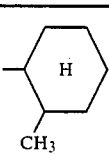 | 529 |
| 113 | 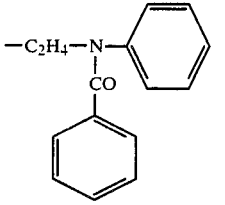 | 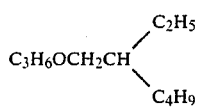 | H | 507.5 |
| 114 | —C₂H₄—N(—C₂H₅)—CO—C₆H₅ 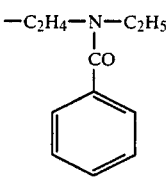 | 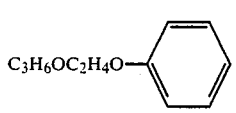 | H | 508 |

We claim:
1. An isothiazolylazo dye of the formula

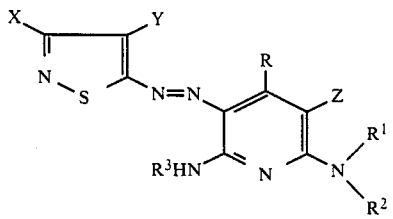

wherein
X is unsubstituted or substituted alkyl, cycloalkyl, aralkyl or aryl,
Y is cyano,
Z is cyano,
R is hydrogen or $C_1$-$C_3$-alkyl,
$R^1$ and $R^3$ independently of one another are each selected from the group consisting of H; and $C_1$-$C_8$-alkyl and $C_1$-$C_8$-alkoxy-($C_1$-$C_8$) alkyl which are unsubstituted or substituted by hydroxyl, $C_1$-$C_8$-alkoxy, phenoxy or phenyl, and $C_1$-$C_8$-cycloalkyl, or phenyl which are unsubstituted or substituted by chlorine, bromine, methyl, ethyl, methoxy or ethoxy,
$R^2$ is a group selected from hydrogen and alkyl, or
$R^1$ and $R^2$, together with the nitrogen atom, form a saturated 5-membered or 6-membered ring.

2. The compound of claim 1, having the formula

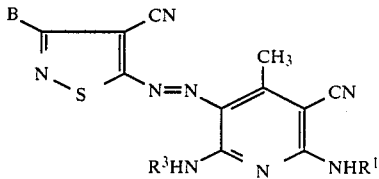

wherein
B is selected from the group consisting of methyl, isopropyl, phenyl and benzyl; the phenyl and benzyl groups being unsubstituted or substituted by methyl, methoxy, chlorine or bromine.

* * * * *